(12) United States Patent
Higuchi et al.

(10) Patent No.: US 8,396,071 B2
(45) Date of Patent: Mar. 12, 2013

(54) BASE STATION, MOBILE STATION, AND COMMUNICATIONS METHOD

(75) Inventors: Kenichi Higuchi, Saitama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 285 days.

(21) Appl. No.: 12/970,527

(22) Filed: Dec. 16, 2010

(65) Prior Publication Data

US 2011/0085514 A1  Apr. 14, 2011

Related U.S. Application Data

(63) Continuation of application No. 12/160,861, filed as application No. PCT/JP2007/050260 on Jan. 11, 2007, now Pat. No. 7,983,292.

(30) Foreign Application Priority Data

Jan. 18, 2006  (JP) .................................. 2006-010498

(51) Int. Cl.
   *H04B 7/212* (2006.01)
(52) U.S. Cl. ..................................................... 370/442
(58) Field of Classification Search .............. 370/442, 370/441, 438, 446, 436, 433, 432, 431, 477, 370/476, 475, 474, 465, 464
   See application file for complete search history.

(56) References Cited

U.S. PATENT DOCUMENTS

| 5,235,599 | A | 8/1993 | Nishimura et al. |
| 6,175,575 | B1 | 1/2001 | Ahuja et al. |
| 6,600,722 | B1 | 7/2003 | Tran et al. |
| 7,684,334 | B2 | 3/2010 | Shiokawa et al. |
| 7,983,292 | B2 * | 7/2011 | Higuchi et al. ............... 370/442 |
| 8,233,459 | B2 * | 7/2012 | Higuchi et al. ............... 370/335 |
| 2009/0220014 | A1 | 9/2009 | Higuchi et al. |
| 2010/0086065 | A1 * | 4/2010 | Higuchi et al. ............... 375/260 |
| 2010/0128805 | A1 * | 5/2010 | Tanno et al. ................... 375/260 |
| 2010/0232311 | A1 * | 9/2010 | Zhang et al. .................. 370/252 |
| 2011/0051711 | A1 * | 3/2011 | Kishiyama et al. ........... 370/350 |
| 2012/0236783 | A1 * | 9/2012 | Park et al. ..................... 370/315 |
| 2012/0263127 | A1 * | 10/2012 | Moon et al. ................... 370/329 |

FOREIGN PATENT DOCUMENTS

| JP | 2003-348648 A | 12/2003 |
| JP | 2004-007279 A | 1/2004 |
| JP | 2005-502218 A | 1/2005 |
| JP | 2005-130491 A | 5/2005 |
| WO | 2005039094 A2 | 4/2005 |

OTHER PUBLICATIONS

International Search Report from PCT/JP2007/050260 dated Apr. 10, 2007 (5 pages).
Written Opinion from PCT/JP2007/050260 dated Apr. 10, 2007 (4 pages).
"Physical Channel Concept for Scalable Bandwidth in EvolvedUTRA Downlink"; 3GPP TSG RAN WG1 Ad Hoc on LTE; Jun. 21, 2005, R1-050592, pp. 1-14 (14 pages).
"E-UTRA Cell Search"; TSG-RAn WG1; Jan. 25, 2006; R1-060105, pp. 1-7 (7 pages).

(Continued)

*Primary Examiner* — Fan Ng
(74) *Attorney, Agent, or Firm* — Osha Liang LLP

(57) ABSTRACT

A base station carrying out communications with a mobile station with an Orthogonal Frequency Division Multiplexing (OFDM) method by using a predetermined frequency band out of a transmission band is disclosed. The base station includes an allocation portion that allocates, for a mobile station performing peripheral cell search, a band that includes a center frequency on a raster of a first band and has a bandwidth equal to or greater than a bandwidth of a second band with which a synchronization channel is transmitted.

8 Claims, 9 Drawing Sheets

OTHER PUBLICATIONS

"Cell Search Procedure for Initial Synchronization and Neighbor Cell Identification"; 3GPP TSG RAn WG1 Meeting #43; Nov. 11, 2005; R1-051412 (6 pages).
"Cell Search and Initial Acquisition for OFDM Downlink"; 3GPP TSG RAN1 #43; Nov. 11, 2005; R1-051329, pp. 1-7 (7 pages).
3GPP TS 25.214 V6.7.0 "Physical layer procedures (FDD)," Sep. 2005, 60 pages.
Keiji Tachikawa, "W-CDMA Mobile Communication System" published y Maruzen K.K., pp. 35-45, Jun. 25, 2001, 19 pages.
Japanese Office Action for Application No. 2006-010498, mailed on Sep. 1, 2009 (5 pages).
U.S. Office Action for U.S. Appl. No. 12/160,861, mailed on Sep. 15, 2010 (12 pages).
NTT DoCoMo et al., "Text Proposal on Cell Search in Evolved UTRA", R1-051308 3GPP, Nov. 7, 2005, URL: <http://www.3gpp.org/ftp/tsg_ran/WG1_RL1/TSGR1_43/Docs/R1-051308.zip>.
Russian Office Action for Application No. 2008132769/09, mailed on May 20, 2010 (10 pages).
U.S. Office Action for U.S. Appl. No. 12/160,861, mailed on Jan. 12, 2011 (6 pages).

* cited by examiner

BLOCK BANDWIDTH

SCH

BLOCK BANDWIDTH

SCH

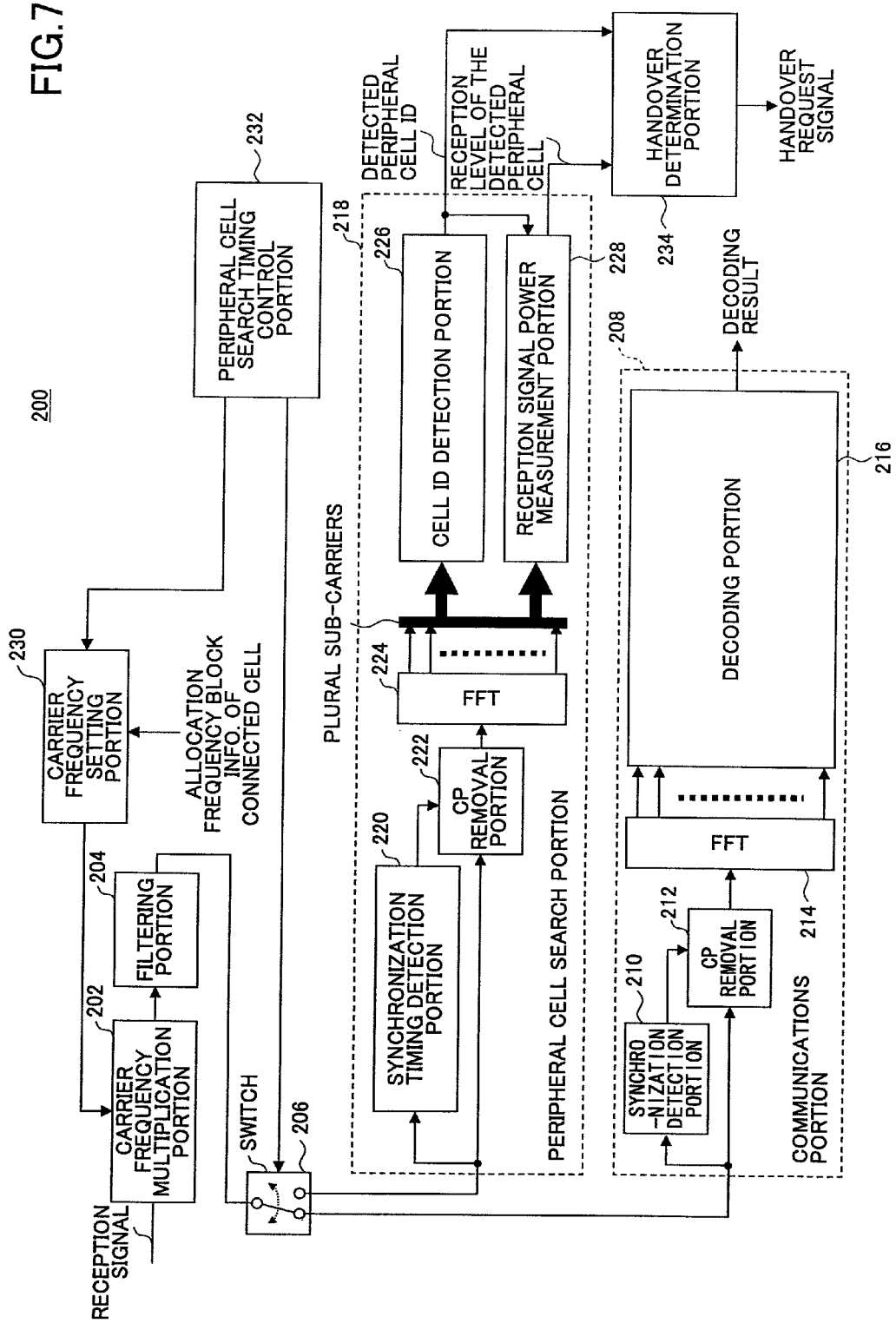

BASE STATION, MOBILE STATION, AND COMMUNICATIONS METHOD

CROSS-REFERENCE TO RELATED APPLICATIONS

This is a continuation application of U.S. patent application Ser. No. 12/160,861 filed Jul. 14, 2008, which is a national stage application of PCT/JP2007/050260, which claims priority to JP2006/010498.

TECHNICAL FIELD

The present invention generally relates to a technical field of radio communications, specifically to a base station, a mobile station, and a communications method that can be used in various bands.

BACKGROUND ART

In existing communications systems of Wideband Code Division Multiple Access (W-CDMA), Global System for Mobile communications, and the like, a center frequency of frequency bands used for communications is determined to coincide with a predetermined frequency called a raster or a frequency raster. The frequency rasters are arranged, for example, every 200 kHz on a frequency axis.

Therefore, a mobile station can identify the center frequency of an operator and thus connect to a downlink by searching for the frequency rasters by turns on the frequency axis (searching every 200 kHz). Downlink cell search is described in Keiji TACHIKAWA, "W-CDMA mobile communications method", Maruzen, Inc., pp. 35-45.

SUMMARY OF INVENTION

Problem to be Solved by the Invention

A radio communications system based on an Orthogonal Frequency Division Multiplexing (OFDM) method that uses plural wide or narrow bands has been in consideration. The OFDM method is employed because this method can provide advantages of efficiently suppressing multi-path propagation interference, inter-symbol interference, and the like. In such radio communications systems, a wideband of, for example, 20 MHz and a band (for example, 5 MHz), which is a part of the wideband, are used depending on an apparatus configuration of the mobile station, an apparatus configuration of the base station, applications, and the like, which allows various operators to provide service.

For example, spectra in the OFDM method radio communications system having plural bands are shown in FIG. 1. Communications based on the OFDM method can be carried out in both the wide transmission band of 20 MHz and the narrow transmission band of 5 MHz in relation to the transmission bandwidth of 20 MHz.

In such radio communications systems, there exist terminal devices having a receivable bandwidth that is narrower than the transmission bandwidth of the base station. For example, a terminal device having a receivable bandwidth of 5 MHz carries out communications using a frequency band including a center frequency of the wide bandwidth of 20 MHz.

The objective of the present invention is to provide a base station, a mobile station and a transmission method that facilitate peripheral cell detection in a mobile transmission system where the OFDM method of communications is carried out in any one of two or more frequency bands.

Means for Solving the Problem

In order to eliminate the above disadvantage, a base station according to an embodiment of the present invention 1 carries out communications with a mobile station with an Orthogonal Frequency Division Multiplexing (OFDM) method by using a predetermined frequency band out of a transmission band, the base station including an allocation portion that allocates for a mobile station performing peripheral cell search a band that includes a center frequency on a raster of a first band and has a bandwidth equal to or wider than a bandwidth of a second band with which a synchronization channel is transmitted.

With such a configuration, the mobile station can carry out the peripheral cell search using the band including the center frequency.

A communications method according to an embodiment of the present invention carries out communications with a mobile station with an Orthogonal Frequency Division Multiplexing (OFDM) method by using a predetermined frequency band out of a transmission band, the method including steps of transmitting a synchronization channel with a second band including a center frequency on a raster of a first band, and allocating for a mobile station performing peripheral cell search a band that includes the center frequency on the raster of the first band and has a bandwidth equal to or greater than a bandwidth of a second band for transmitting the synchronization channel.

With this, the mobile station can carry out the peripheral cell search using the center frequency.

A mobile station according to an embodiment of the present invention carries out communications due to an Orthogonal Frequency Division Multiplexing (OFDM) method with a base station that carries out communications by using a predetermined frequency band out of a transmission band, the mobile station including a reception portion that receives a downlink signal transmitted using the predetermined frequency band; a synchronization channel detection portion that detects a synchronization channel transmitted with a second band including a center frequency on a raster of a first band; a carrier frequency setting portion that sets a carrier frequency in a band having a bandwidth equal to or greater than the second band having the center frequency when carrying out peripheral cell search; and a control portion that carries out switching control of the carrier frequency.

With such a configuration, the mobile station can carry out the peripheral cell search due to the synchronization channel transmitted with the second band including the center frequency on a raster of the first band.

A communications method according to an embodiment of the present invention carries out communications due to an Orthogonal Frequency Division Multiplexing (OFDM) method with a base station that carries out communications by using a predetermined frequency band out of a transmission band, the method including steps of receiving a downlink signal transmitted using a predetermined frequency band; detecting a synchronization channel transmitted with a second band including a center frequency on a raster of a first band; setting a carrier frequency in a band having a bandwidth equal to or wider than a second band including the center frequency when carrying out peripheral cell search; and switching the carrier frequency.

With this, the mobile station can carry out the peripheral cell search due to the synchronization transmitted with the second band including the center frequency on the raster of the first band.

Advantage of the Invention

According to an embodiment of the present invention, there can be realized a base station, a mobile station, and a communications method that facilitate peripheral cell detection in a mobile communications system where the OFDM method of communications is carried out in any one of one or more frequency bands.

BRIEF DESCRIPTION OF THE DRAWINGS

FIG. 7 is a block diagram illustrating a reception apparatus according to one embodiment of the present invention.

LIST OF REFERENCE SYMBOLS

100: transmission apparatus
200: reception apparatus

BEST MODE FOR CARRYING OUT THE INVENTION

Based on the following embodiments, a best mode for carrying out the present invention is described with reference to the drawings.

The same reference marks are used for elements having the same function in all the drawings for explaining the embodiments, and repeated explanations are omitted.

A radio communications system according to one embodiment of the present invention is provided with a base station apparatus and a mobile station apparatus.

The base station carries out communications based on the Orthogonal Frequency Division Multiplexing (OFDM) method with the mobile station, using a predetermined frequency band out of a transmission band.

In this embodiment, the base station uses a bandwidth of 20 MHz and the mobile station uses a bandwidth of 5 MHz, as one example. However, this embodiment can be applied to a situation where a terminal device uses a certain part of the transmission band of the base station.

Figure 1:
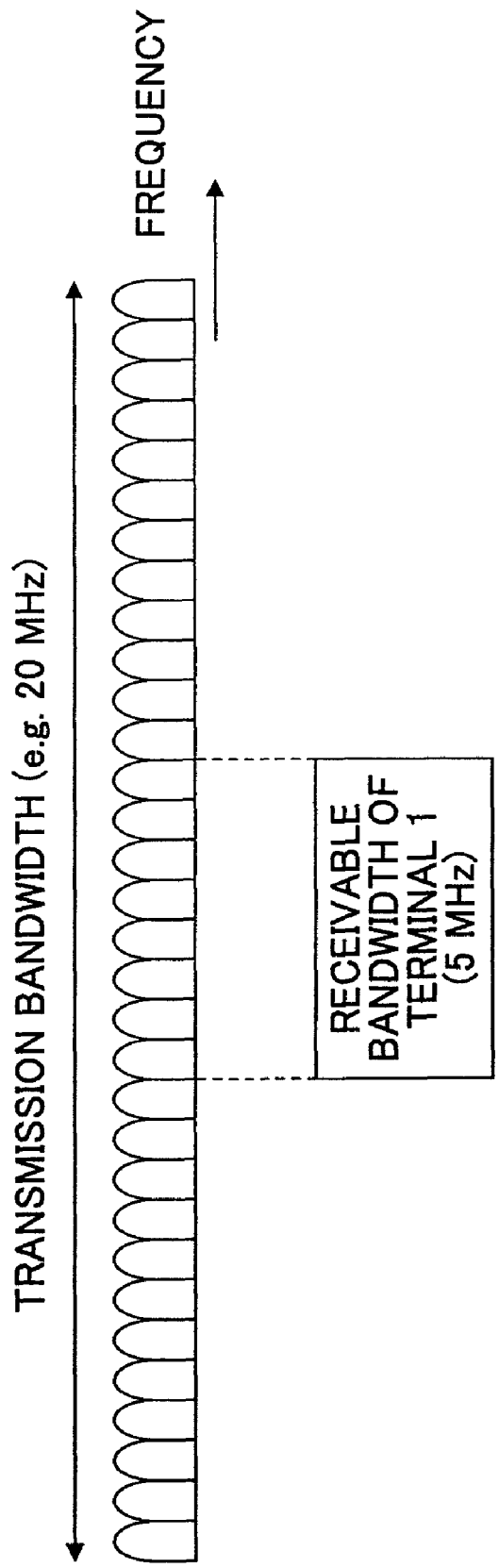
FIG. 1 is an explanatory view illustrating the spectrum of an OFDM method radio communications system having plural bandwidths.
Figure 2:
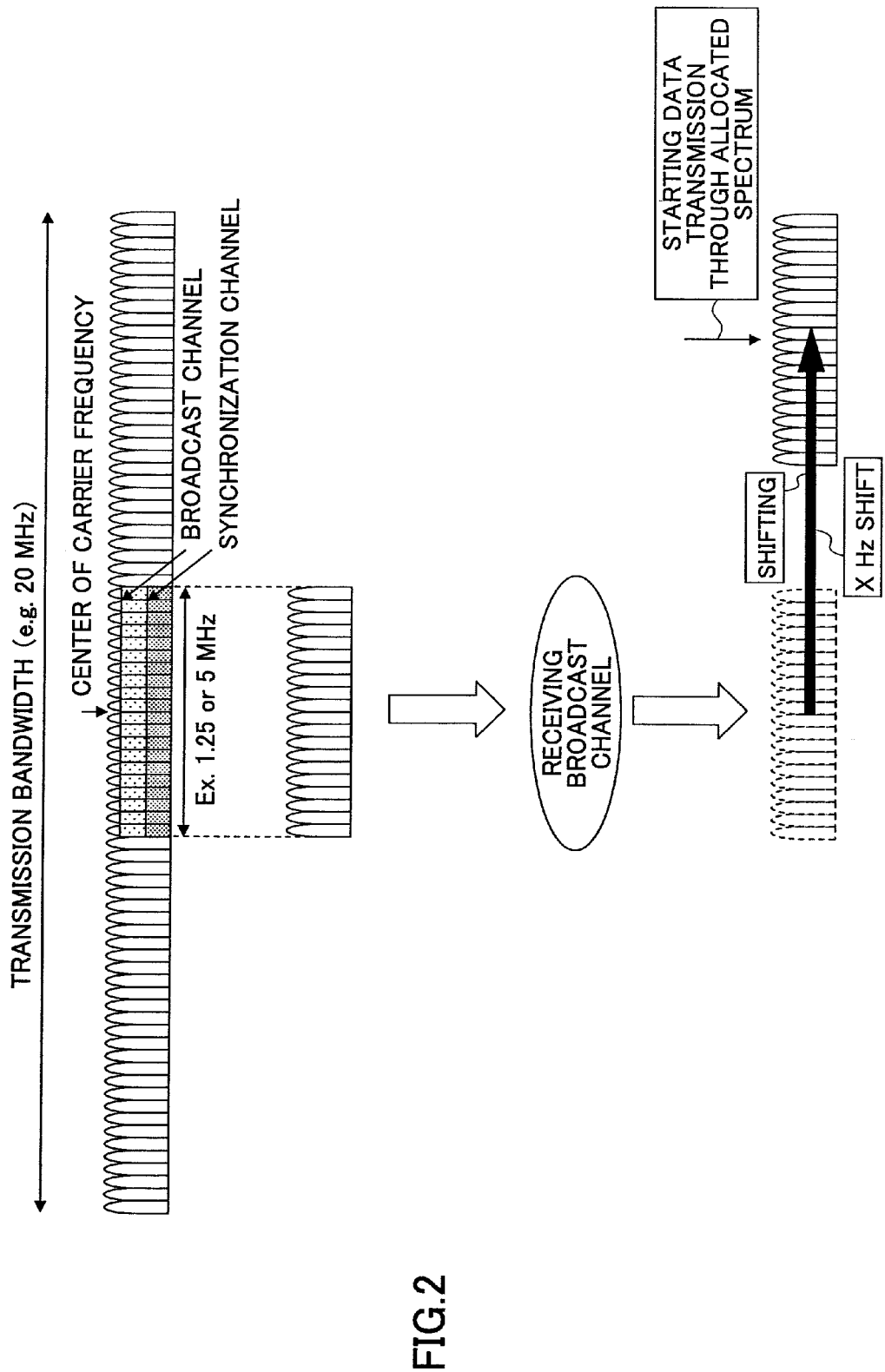
FIG. 2 is an explanatory view illustrating a cell search method at the time of starting communications, according to one embodiment of the present invention.
Figure 3:
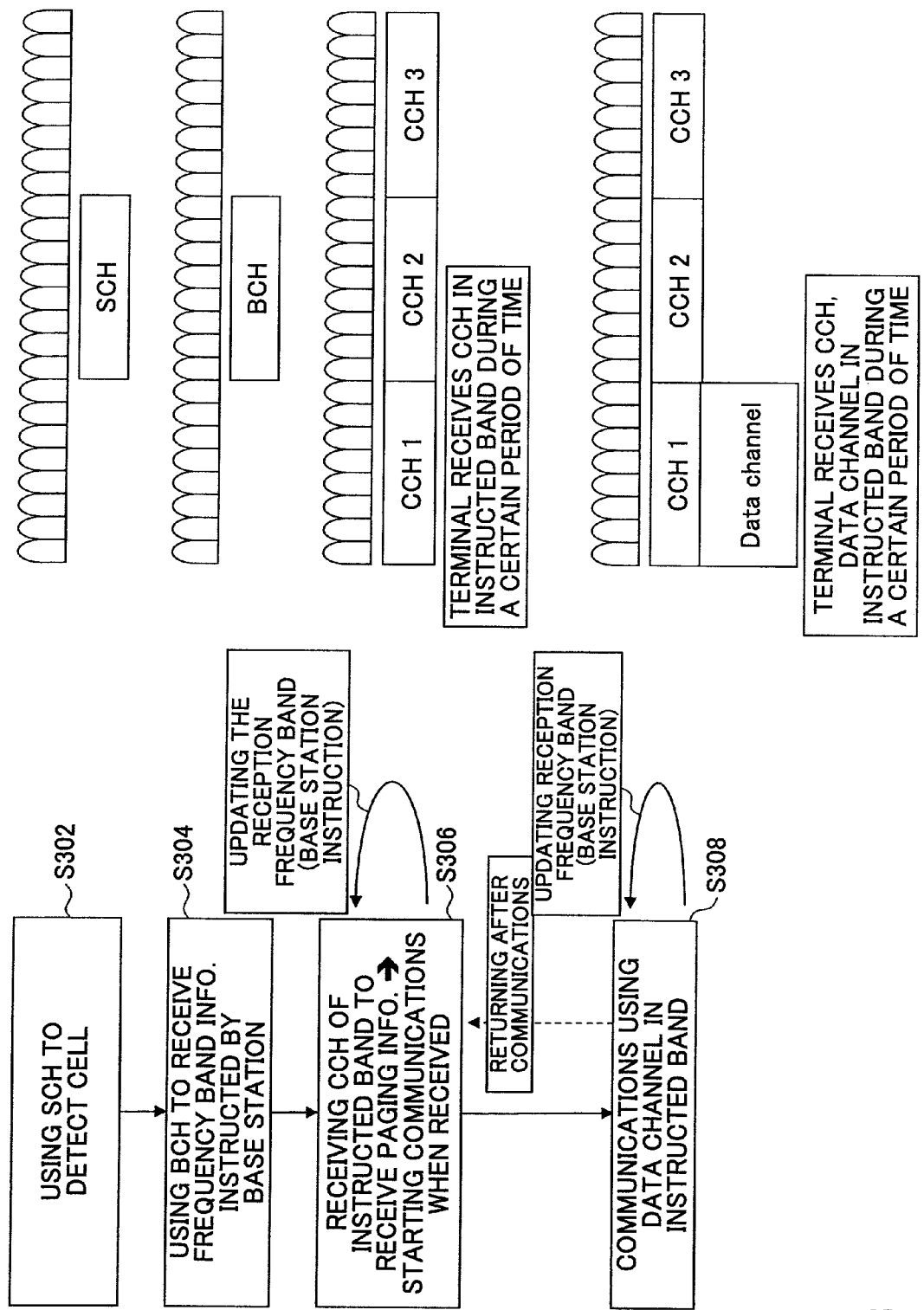
FIG. 3 is a flowchart illustrating shifting to a band to be used after a cell search.

First, a cell search method at the time of starting communications is explained with reference to FIGS. 2 and 3.

The base station and the mobile station can carry out communications using any one of various wide or narrow frequency bands. In this embodiment, the mobile station has a receivable bandwidth narrower than the transmission bandwidth of the base station. In this embodiment, a first band indicates a transmission signal bandwidth of the base station, and a second band indicates the narrowest receivable bandwidth among all receivable bandwidths of all the mobile stations. Therefore, the bandwidth of the first band is equal to or greater than the bandwidth of the second bandwidth. The bandwidth of the second band is equal to transmission bandwidths of a synchronization channel, a broadcast channel, and a control channel in the base station (a bandwidth of a frequency block). In addition, the bandwidth of the second band is a bandwidth equal to or less than a receivable bandwidth of a terminal device that has the lowest performance among the plural terminal devices prepared in the system, the terminal devices having various receivable bandwidths, and determined in advance by the system.

The mobile station uses the synchronization channel (SCH) to carry out cell search (step S302). For example, the base station uses a predetermined frequency band out of the transmission band in order to transmit a downlink signal. For example, the base station transmits the synchronization channel using the second band including a center frequency on a raster of the first band. The mobile station receives the downlink signal.

For example, the mobile station detects a band that includes the center frequency of the 20 MHz and has a bandwidth of 1.25 MHz or more, for example, 1.25 MHz or 5 MHz, out of the 20 MHz spectrum. When the base station uses a bandwidth of 20 MHz and the mobile station uses the same bandwidth of 20 MHz, the mobile station can easily find the center frequency of the 20 MHz band by the cell search.

When the mobile station uses a bandwidth of 5 MHz whose center frequency is different from the center frequency of the 20 MHz band, the center frequency of the 20 MHz band is detected by carrying out correlation detection in accordance with a predetermined synchronization pattern. The correlation calculation makes it possible to detect the center of the band because a correlation value becomes smaller due to only one sub-carrier deviation. As the synchronization pattern, a PN code sequence, a Gold code sequence, and other various sequences may be used.

For example, a 20 MHz band, a 10 MHz band, and a 5 MHz band are prepared in a cell where the mobile station exists, and the mobile station can use any one of the bands.

Next, the mobile station receives the broadcast channel (BCH) transmitted from the base station and obtains frequency band information indicated by the base station by using the broadcast band (step S304). The base station maps the synchronization channel over all the sub-carriers and transmits the mapped signal. In addition, the base station transmits the synchronization channel to all the users using the 5 MHz band having the center frequency of the 20 MHz band at the center. The mobile station using the 5 MHz band can detect the center frequency of the broadcast channel and appropriately demodulate the broadcast channel transmitted in the 5 MHz band whose center corresponds to the center frequency. The broadcast channel includes center frequency information that makes it possible to identify a position of the center frequency of the 5 MHz band, which is used as a part of the 20 MHz band. Generally, the center frequency is not on a raster. The center frequency information may include information indicating how far the frequency is away from the frequency on the raster, for example.

Next, the mobile station demodulates the broadcast channel, reads the center frequency information, and adjusts the frequency synthesizer in a radio portion in order to tune in the center of the 5 MHz band, which the mobile station uses, to the center frequency included in the center frequency information. Namely, the mobile station sets a carrier frequency to a band that includes the center frequency included in the center frequency information and has a bandwidth equal to or more than the bandwidth of the second band.

Subsequently, the mobile station receives the control channel (CCH), using the designated band, for example, a rightmost band of 5 MHz out of the 20 MHz band, and starts communications (step S306). For example, the mobile station receives the CCH in the instructed band, refers to control information (paging information) that is included in the CCH and indicates the presence/absence of an incoming call to the mobile station, and starts communications when receiving the paging information to the mobile station. In addition, the mobile station updates the reception frequency band depending on instruction from the base station.

Next, the mobile station carries out communications, using a data channel in the instructed band (step S308). For example, the mobile station receives the CCH and the data channel in the instructed band in a predetermined period of time. In addition, the mobile station updates the reception frequency band depending on instruction from the base station. When the mobile station completes the communications using the data channel in the instructed band, the procedure returns to step S306.

Figure 4:
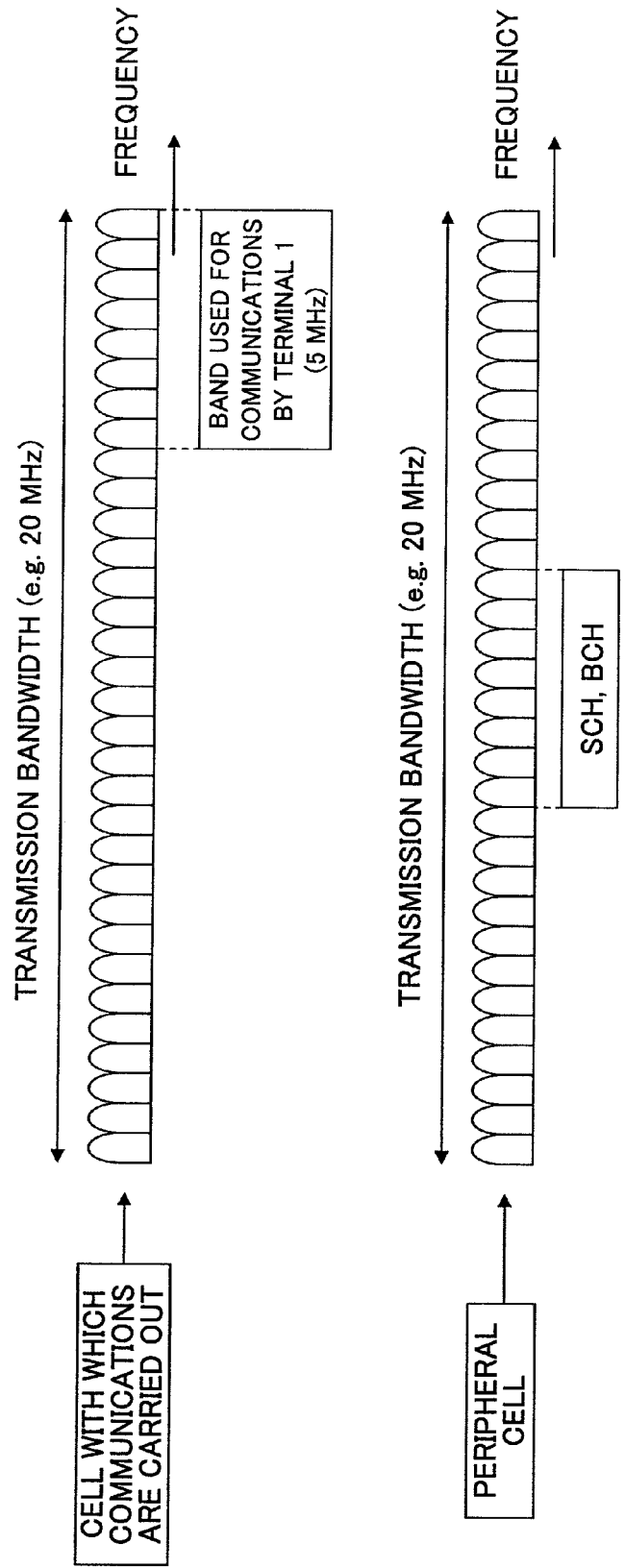
FIG. 4 is an explanatory view of the cell search according to the embodiment of the present invention.

In step S306 and step S308, when the mobile station carries out the communications with the base station, using the rightmost band of 5 MHz, the mobile station once shifts the center frequency to the center of the transmission band and carries out peripheral cell search, in other words, detects an SCH and a BCH, in order to search peripheral cells during communications, as shown in FIG. 4. The mobile station swiftly returns the shifted center frequency to the original center frequency after the peripheral cell search, and resumes the communications. In this case, the base station allocates a band of 1.25 MHz or more that includes the center frequency on the raster of 20 MHz for the mobile station that carries out the peripheral cell search.

Namely, when a mobile station carrying out communications using a frequency band, which is a part of the system bandwidth, for example, a mobile station carrying out communications using a frequency block that is not the frequency block including the center frequency of the system bandwidth carries out the peripheral cell search, frame timing (including symbol timing) is detected by using the SCH transmitted in the frequency block including the center frequency. In this case, a scramble code (cell ID) is sent through the control channel of the cell where the communications are carried out.

According to this, the peripheral cell search using the SCH needs less time. As a result, high quality communications due to fast handover can be continued.

In this case, the base station does not carry out allocation due to scheduling during which the mobile station may carry out the peripheral cell search. Alternatively, the base station sets up a time period when the allocation due to scheduling is not carried out in order to allow the mobile station to carry out the peripheral cell search, and the mobile station carries out the peripheral cell search during the time period.

When the peripheral cell search is carried out, the SCH transmitted through a frequency block including the center frequency is required to be received in addition to the frequency block allocated for communications, as described above. By not carrying out the allocation due to the scheduling in a time period when the peripheral cell search is carried out, concurrent reception of different frequencies is not necessary in the mobile station, thereby simplifying a configuration of the reception apparatus.

Figure 5:
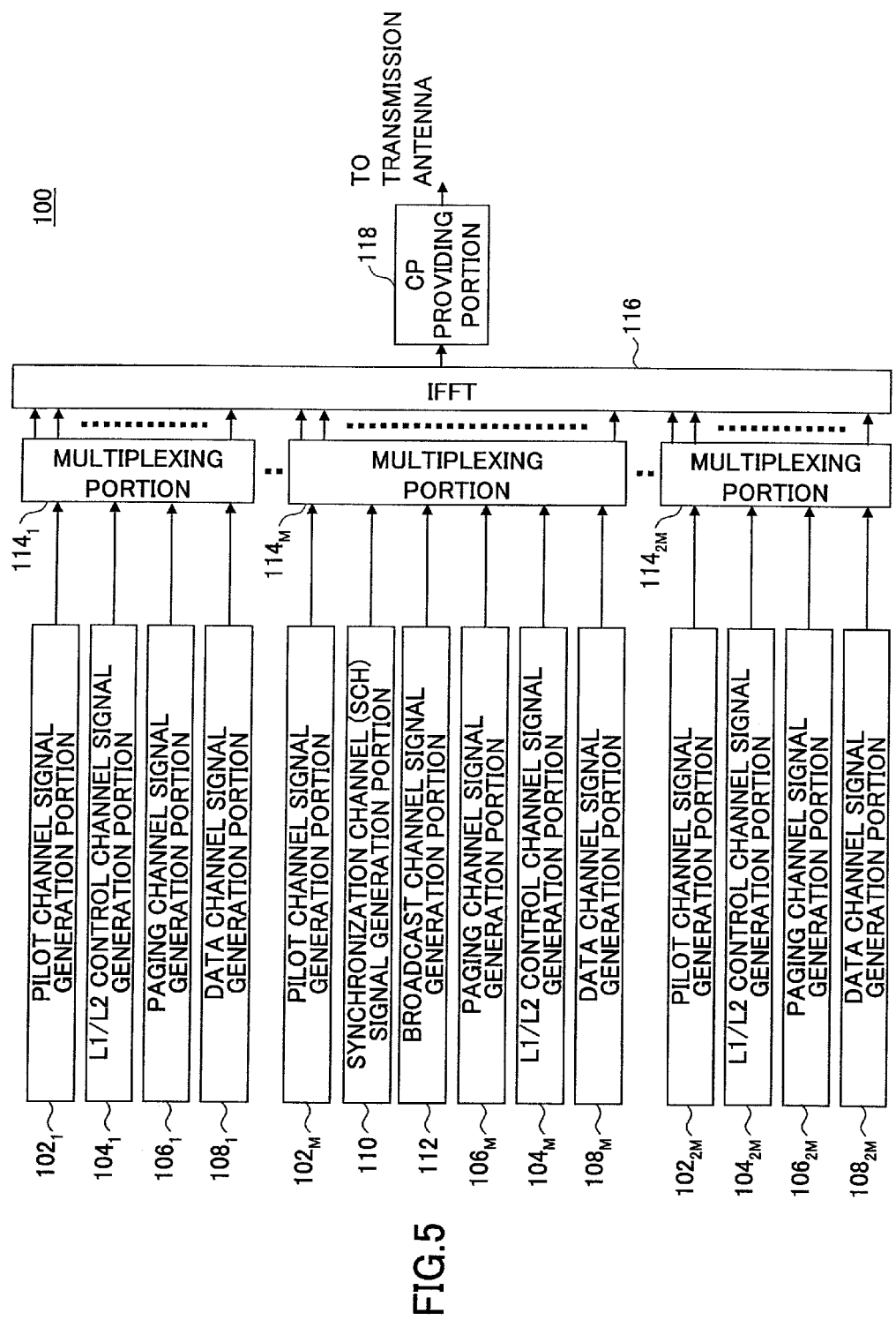
FIG. 5 is a block diagram illustrating a transmission apparatus according to the embodiment of the present invention.

Next, a configuration of a transmission apparatus according to this embodiment is explained with reference to FIG. 5. The transmission apparatus is provided in, for example, the base station.

A transmission apparatus 100 includes pilot channel signal generation portions $102_i$ ($1 \leq i \leq 2M$), L1/L2 control channel signal generation portions $104_i$, paging channel signal generation portions $106_i$, and data channel signal generation portions $108_i$ that are prepared depending on the number 2M (M: integer, 1 or greater) of frequency blocks; multiplexing portions $114_i$ that are prepared depending on the number 2M of the frequency blocks and connected to the pilot channel signal generation portions $102_i$, the L1/L2 control channel signal generation portions $104_i$, the paging channel signal generation portions $106_i$, and the data channel signal generation portions $108_i$; an IFFT 116 connected to the multiplexing portion $114_i$; a CP providing portion 118 connected to the IFFT $116_i$; and a synchronization channel (SCH) signal generation portion 110 and a broadcast channel signal generation portion 112 that are connected to the multiplexing portion $114_M$.

The M-th frequency block includes the center frequency of the transmission bandwidth of the transmission apparatus 100.

The pilot channel signal generation portions $102_i$ generate pilot channel signals and output the pilot channel signals to the multiplexing portions $114_i$. The L1/L2 control channel signal generation portions $104_i$ generate L1/L2 control channel signals and output the L1/L2 control channel signals to the multiplexing portions $114_i$. The paging channel signal generation portions $106_i$ generate paging channel signals and output the paging channel signals to the multiplexing portions $114_i$. The data channel signal generation portions $108_i$ generate data channel signals and output the data channel signals to the multiplexing portions $114_i$. The synchronization channel signal generation portion 110 generates a synchronization channel signal and outputs the synchronization channel signal to the multiplexing portion $114_M$. The broadcast channel signal generation portion 112 generates a broadcast channel signal and outputs the broadcast channel signal to the multiplexing portion $114_M$.

The multiplexing portions $114i$ ($i \neq M$) corresponding to frequency blocks that are not the M-th frequency block multiplex the pilot channels that transmit the pilot channel signals, the L1/L2 control channels that transmit the L1/L2 control channel signals, the paging channels that transmit the paging channel signals, and the data channels that transmit the data channel signals, and output the multiplexed signal to the IFFT 116.

In addition, the multiplexing portion 114M corresponding to the M-th frequency block multiplexes the pilot channel that transmits the pilot channel signal, the L1/L2 control channel that transmits the L1/L2 control channel signal, the paging channel that transmits the paging channel signal, the data channel that transmits the data channel signal, the synchronization channel that transmits the synchronization channel signal, and the broadcast channel that transmits the broadcast channel signal, and outputs the multiplexed signal to the IFFT 116.

The IFFT 116 performs Inverse Fast Fourier Transformation on the multiplexed signal.

The CP providing portion 118 provides a guard interval to the signal that has been modulated by the OFDM method after the Inverse Fast Fourier Transformation, and outputs symbols to be transmitted. Then, a signal form of the symbols to be transmitted is transformed into a signal form for transmitting in a radio frequency, and the transmission is carried out.

In the transmission apparatus 100, the transmission bandwidth of the SCH may be 2n×a block bandwidth (n: integer, 1 or more).

Figure 6A:
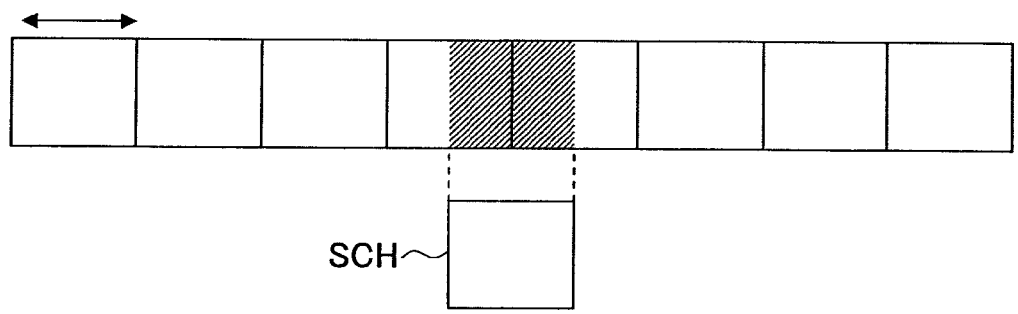
FIG. 6A is an explanatory view illustrating an SCH transmission bandwidth.

Because the SCH is transmitted by the center of the system bandwidth, the SCH may be mapped in only a part of the two frequency blocks in the center when the block bandwidth and the SCH bandwidth are identical, for example, when the block bandwidth is 1.25 MHz and the SCH bandwidth is 1.25 MHz, as shown in FIG. 6A.

Figure 6B:
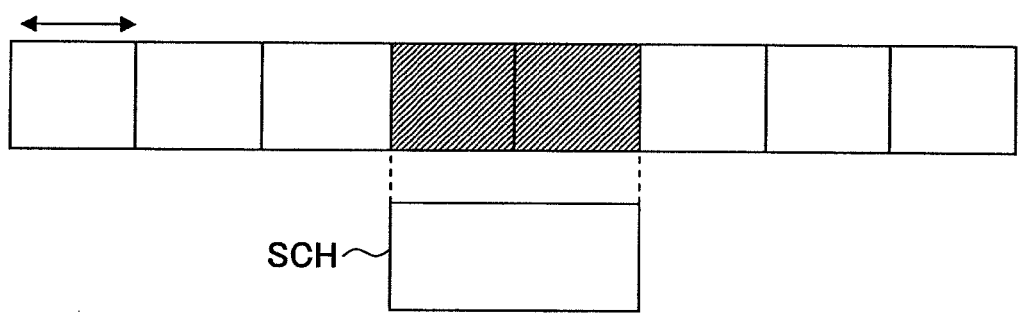
FIG. 6B is an explanatory view illustrating an SCH transmission bandwidth.

However, by setting the SCH transmission bandwidth to be 2n×the block bandwidth, the above problem, that is, a problem of the SCH being mapped in only a part of the central two frequency blocks can be solved, as shown in FIG. 6B.

Next, a reception apparatus 200 according to this embodiment of the present invention is explained with reference to FIG. 7. The reception apparatus 200 is provided in, for example, a mobile station.

The reception apparatus 200 includes a carrier frequency multiplication portion 202 to which a reception signal is input, a filtering portion 204 to which an output signal of the carrier frequency multiplication portion 202 is input, a switch 206 connected to the filtering portion 204, a peripheral cell search portion 218 and a communications portion 208 that are switchably connected to the switch 206, a handover determination portion 234 connected to the peripheral cell search portion 218, a peripheral cell search timing control portion 232 serving as a controller, and a carrier frequency setting portion 230 connected to the peripheral cell search timing control portion 232. Information indicating an allocation frequency block allocated to a connected cell is input to the carrier frequency setting portion 230, and information indicating a carrier frequency is input to the carrier frequency multiplication portion 202. The peripheral cell search timing control portion 232 controls the switch 206.

In addition, the communications portion 208 includes a synchronization detection portion 210 and a CP removal portion 212 that are connected to the switch 206, an FFT 214 connected to the CP removal portion 212, and a decoding portion 216 connected to the FFT 214. The synchronization detection portion 210 is connected to the CP removal portion 212.

In addition, the peripheral cell search portion 218 includes a synchronization timing detection portion 220 that is connected to the switch 206 and serves as a synchronization channel detector, a CP removal portion 222 connected to the switch 206, an FFT 224 connected to the CP removal portion 222, and a cell ID detection portion 226 and a reception signal power measurement portion 228 that are connected to the FFT 224. The synchronization timing detection portion 220 is connected to the CP removal portion 222. The cell ID detection portion 226 and the reception signal power measurement portion 228 are connected to the handover determination portion 234. An output signal of the cell ID detection portion 226 is input to the reception signal power measurement portion 228.

The reception signal is multiplied by a carrier frequency set by the carrier frequency setting portion 230 in the carrier frequency multiplication portion 202, and then filtered by the filtering portion 204.

The peripheral cell search timing control portion 232 controls the switch 206. The peripheral cell search timing control portion 232 switches the switch 206 so that communications or the peripheral cell search is carried out at an arbitrary timing. For example, the base station 100 informs the mobile station 200 of data allocation, for example, through the CCH, when data are allocated. The mobile station 200 determines whether there are data incoming to the same mobile station 200 in accordance with the received CCH. When it is determined in accordance with the paging information stored in the CCH as a result of the reception of the CCH that there are no data incoming to the mobile station 200, the mobile station 200 goes into a waiting state until reception of the next CCH. The peripheral cell search timing control portion 232 controls the switch 206 so that the peripheral cell search is carried out during the waiting state.

Additionally, in this case, the peripheral cell search timing control portion 232 outputs to the carrier frequency setting portion 230 information indicating that the peripheral cell search is being carried out. When the carrier frequency setting portion 230 inputs the information, the carrier frequency setting portion 230 sets the frequency corresponding to the M-th frequency block including the center frequency of the transmission band of the connected cell, and outputs information indicating the frequency to the carrier frequency multiplication portion 202.

In addition, when the peripheral cell search is being not carried out, the peripheral cell search timing control portion 232 outputs to the carrier frequency setting portion 230 information indicating that the communications are being carried out. When the carrier frequency setting portion 230 inputs the information, the carrier frequency setting portion 230 sets the frequency corresponding to the allocated frequency block in accordance with allocation frequency block information of the connected cell, and outputs information indicating the frequency to the carrier frequency multiplication portion 202.

When the peripheral cell search is being carried out, the synchronization channel transmitted from a peripheral base station is used to detect a timing of the synchronization channel by the synchronization timing detection portion 220, and the CP is removed by the CP removal portion 222 in accordance with the detected timing. In addition, the signal after the CP removal undergoes the Fast Fourier Transformation in the FFT 224. The FFT 224 outputs plural sub-carrier signals.

The cell ID detection portion 226 detects the cell ID (peripheral cell ID) from the signal that has undergone the Fast Fourier Transformation, and outputs information indicating the cell ID to the handover determination portion 234 and the reception signal power measurement portion 228.

The reception signal power measurement portion 228 measures reception power of the signal that has undergone the Fast Fourier Transformation, corresponding to each of the cell IDs, and outputs information indicating the reception power (peripheral cell reception level) to the handover determination portion 234.

The handover determination portion 234 determines in accordance with the detected peripheral cell ID and the peripheral cell reception level corresponding to the detected peripheral cell whether the handover should be carried out. When it is determined that the handover should be carried out, the handover determination portion 234 feedbacks a handover request signal for requesting the handover to the base station.

In addition, when the communications with the connected cell are being carried out, predetermined processes are carried out in the communications 208.

The synchronization detection portion 210 carries out synchronization detection in accordance with the reception signal, and outputs information indicating the synchronization timing to the CP removal portion 212. The CP removal portion 212 removes the CP of the reception signal in accordance with the synchronization timing. The signal after the CP removal undergoes the Fast Fourier Transformation in the FFT 214, and is output to the decoding portion 216. The decoding portion 216 carries out a decoding process on the signal that has undergone the Fast Fourier Transformation, and outputs the decoding result. Specifically, the decoding portion 216 decodes the data channel, the paging channel, and the control channel of the allocated frequency band of the connected cell. As a result, the decoding result is output from the decoding portion 216.

Next, the transmission apparatus 100 according to another embodiment of the present invention is explained.

The transmission apparatus 100 according to this embodiment transmits the paging information through the frequency block including the center frequency of the entire band.

Figure 8:
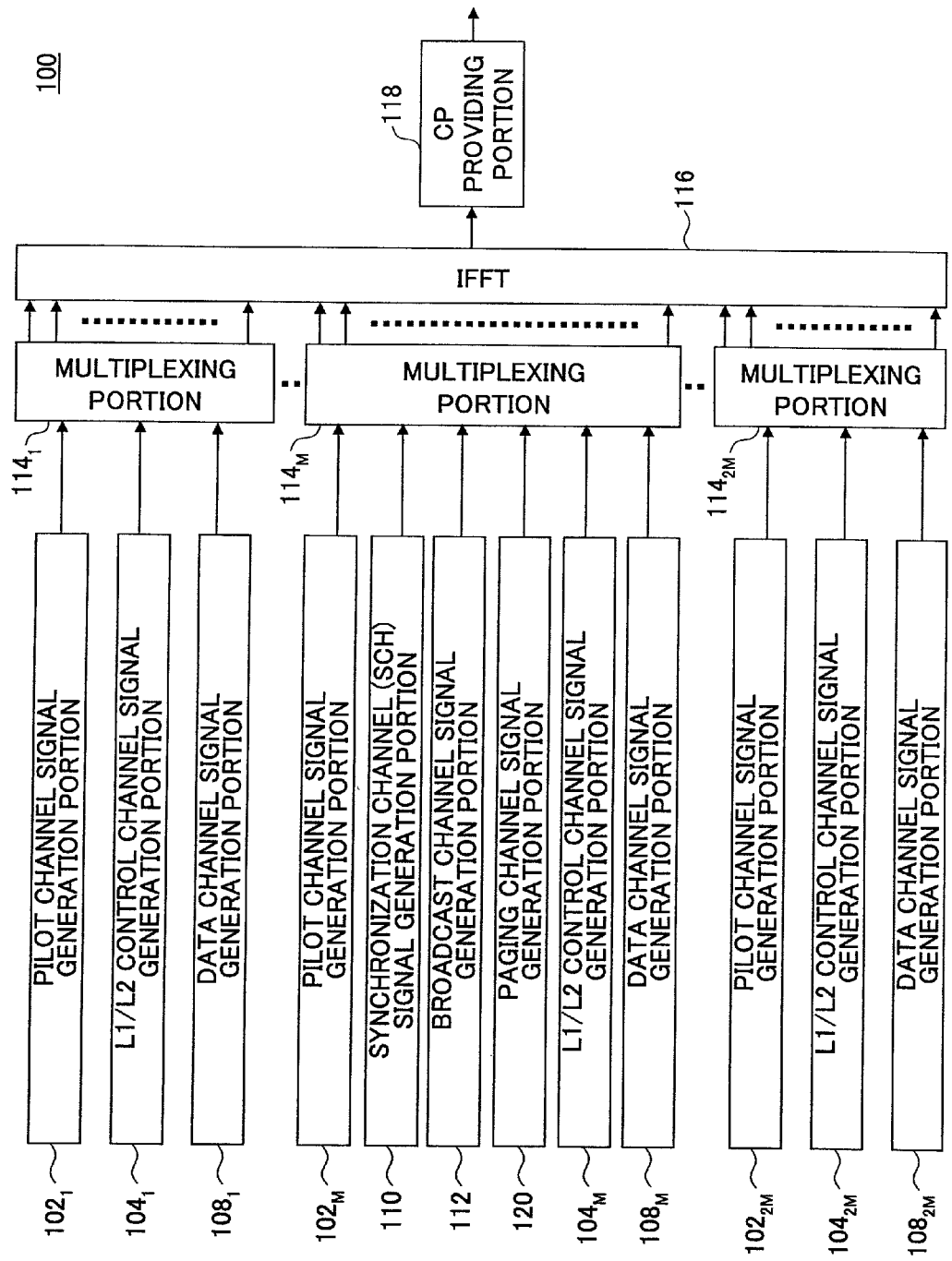
FIG. 8 is a block diagram illustrating a reception apparatus according to one embodiment of the present invention.

As shown in FIG. 8, the transmission apparatus 100 is provided, for example, in a base station, and includes the pilot channel signal generation portions $102_i$ ($1 \leq i \leq 2M$), the L1/L2 control channel signal generation portions $104_i$, and the data channel signal generation portions $108_i$ that are prepared depending on the number 2M (M: integer, 1 or greater) of frequency blocks; the multiplexing portions $114_i$ that are prepared depending on the number 2M of the frequency blocks and connected to the pilot channel signal generation portions $102_i$, the L1/L2 control channel signal generation portions $104_i$, and the data channel signal generation portions $108_i$; the IFFT 116 connected to the multiplexing portion $114_i$; the CP providing portions 118 connected to the IFFT 116; and the synchronization channel (SCH) signal generation portion 110, the broadcast channel signal generation portion 112, and the paging channel signal generation portion 120 that are connected to the multiplexing portion $114_M$.

The M-th frequency block includes the center frequency of the transmission bandwidth of the transmission apparatus 100.

The pilot channel signal generation portions $102_i$ generates the pilot channel signals and output the pilot channel signals to the multiplexing portions $114_i$. The L1/L2 control channel signal generation portions $104_i$ generate the L1/L2 control channel signals and output the L1/L2 control channel signals to the multiplexing portion $114_i$. The data channel signal generation portions $108_i$ generate the data channel signals and output the data channel signals to the multiplexing portions $114_i$.

The synchronization channel signal generation portion 110 generates the synchronization channel signal and outputs the synchronization channel signal to the multiplexing portion $114_M$. The broadcast channel signal generation portion 112 generates the broadcast channel and outputs the broadcast channel signal to the multiplexing portion $114_M$. The paging channel signal generation portion 120 generates the paging channel and outputs the paging channel to the multiplexing portion $114_M$.

The multiplexing portions $114i$ ($i \neq M$) corresponding to the frequency blocks that are not the M-th frequency block multiplex the pilot channels that transmit pilot channel signals, the L1/L2 control channels that transmit the L1/L2 control channel signals, and the data channels that transmit the data channel signals, and output the multiplexed signal to the IFFT 116.

In addition, the multiplexing portion $114_M$ corresponding to the M-th frequency block multiplexes the pilot channel that transmits the pilot channel signal, the L1/L2 control channel that transmits the L1/L2 control channel signal, the data channel that transmits the data channel signal, the synchronization channel that transmits the synchronization channel signal, the broadcast channel that transmits the broadcast channel signal and the paging channel that transmits the paging channel signal, and outputs the multiplexed signal to the IFFT 116.

The IFFT 116 performs the Inverse Fast Fourier Transformation on the multiplexed signal.

The CP providing portion 118 provides a guard interval to the signal that has been modulated by the OFDM method after the Inverse Fast Fourier Transformation, and outputs symbols to be transmitted. Then, a signal form of the symbols to be transmitted is transformed into a signal form for transmitting in a radio frequency, and the transmission is carried out.

In the transmission apparatus 100, the transmission bandwidth of the SCH may be 2n×a block bandwidth (n: integer, 1 or more).

Next, a reception apparatus 200 according to another embodiment of the present invention is explained. The reception apparatus 200 according to this embodiment has the same configuration as the reception apparatus explained with reference to FIG. 7. However, the switch 206 in the reception apparatus 200 in FIG. 7 is not necessary when the reception apparatus according to this embodiment is in a waiting state.

The transmission apparatus 100 according to this embodiment transmits the paging information through the frequency block including the center frequency of the entire band. The mobile station 200 determines whether there are data incoming to the same mobile station 200 in accordance with the received CCH. When it is determined in accordance with the paging information stored in the CCH as a result of the reception of the CCH that there are no data incoming to the mobile station 200, the mobile station 200 goes into a waiting state until reception of the next CCH. The peripheral cell search timing control portion 232 controls the switch 206 so that the peripheral cell search is carried out during the waiting state.

According to the transmission apparatus 100 of this embodiment, because the paging information is transmitted through the frequency block including the center frequency of the entire band, the frequency band for the paging information can be made identical to the frequency band for the peripheral cell search. Therefore, when it is determined in accordance with the paging information that there are no data incoming to the mobile station 200, the peripheral cell search can be carried out without changing the carrier frequencies. In other words, time necessary for the frequency shifts from the frequency corresponding to the allocated frequency block of the connected cell to the frequency band including the center frequency of the transmission band of the base station and back to the frequency corresponding to the allocated frequency block of the connected cell can be saved. In addition, the peripheral cell search at the time of the waiting state can be simplified.

Next, the transmission apparatus 100 according to yet another embodiment of the present invention is explained.

Because the transmission apparatus 100 according to this embodiment has the same configuration as the transmission apparatus 100 explained with reference to FIG. 5, the explanation is omitted.

Next, a reception apparatus 200 according to yet another embodiment of the present invention is explained. The reception apparatus 200 according to this embodiment has the same configuration as the reception apparatus explained with reference to FIG. 7. However, the switch 206 in the reception apparatus 200 in FIG. 7 is not necessary.

The reception apparatus 100 allocates the frequency band including the center frequency of the transmission band of the base station for the mobile station at the timing of the cell search carried out by the mobile station.

Figure 9:
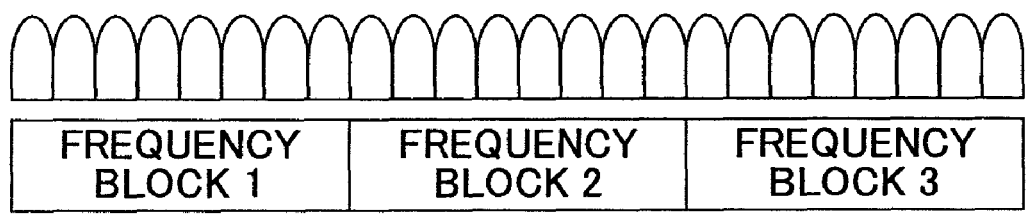
FIG. 9 is an explanatory view illustrating a frequency block allocation method according to one embodiment of the present invention.

For the purpose of illustration, an example where the transmission band of the base station is divided into three frequency blocks is explained with reference to FIG. 9. However, the following explanation holds true when the transmission band of the base station is divided into two or four or more frequency blocks.

Plural mobile stations are grouped, and the divided frequency blocks are allocated for the corresponding groups. The frequency blocks allocated for the corresponding groups are changed in a predetermined time cycle.

For example, the base station divides all the users into plural groups, for example, three groups A, B, and C.

A frequency block for the user group A is a frequency block 1, 2, 3, 1, . . . , at the time t, t+1, t+2, t+3, . . . , respectively. In addition, a frequency block for the user group B is a frequency block 2, 3, 1, 2, . . . , at the time t, t+1, t+2, t+3, . . . , respectively. A frequency block for the user group A is a frequency block 3, 1, 2, 3, . . . , at the time t, t+1, t+2, t+3, . . . , respectively.

The base station changes the group to which the mobile station that requests execution of the peripheral cell search belongs, to the group for which the frequency block including the center frequency is allocated. For example, when the mobile station belonging to the user group A requests the execution of the peripheral cell search at the time t, the base station changes the user group to which the same mobile station belongs from the user group A to the user group B for which the frequency block including the center frequency of the transmission band of the connected cell is allocated at the time t, namely, the frequency block 2. In this case, the same mobile station continues to belong to the user group B after the cell search is completed.

In addition, the base station may temporarily allocate the frequency block including the center frequency for the mobile station requesting the execution of the peripheral cell search. For example, the base station exceptionally allocates the frequency block 2 for the same mobile station during a time period t, and returns the same mobile station to the user group A time t+1 to remain thereafter.

This international patent application is based on Japanese Priority Application No. 2006-010498, filed on Jan. 18, 2006 with the Japanese Patent Office, the entire contents of which are hereby incorporated herein by reference.

Industrial Applicability

A mobile station, a base station, and a transmission method according to the present invention are applicable to a radio communications system.

The invention claimed is:

1. A transmission apparatus comprising:
a synchronization channel signal generation portion configured to generate a synchronization channel signal;
a broadcast channel signal generation portion configured to generate a broadcast channel signal;
a paging channel signal generation portion configured to generate a paging channel signal;
an L1/L2 control channel signal generation portion configured to generate an L1/L2 control channel signal;
a data channel signal generation portion configured to generate a data channel;
a multiplexing portion configured to multiplex the synchronization channel signal, the broadcast channel signal, the paging channel signal, the L1/L2 control channel signal, and the data channel signal; and
a transmission portion configured to transmit a signal multiplexed by the multiplexing portion,
wherein a variable-width system band is divided into a plurality of frequency blocks, each of which is comprised of a plurality of continuous sub-carriers, in the multiplexing portion, and
wherein the multiplexing portion multiplexes the synchronization channel signal and the broadcast channel signal in a plurality of frequency blocks whose number is determined so that a width of the plurality of the frequency blocks is smaller than the smallest width among widths of corresponding variable bands, regardless of the width of the system band, the plurality of the frequency blocks including a center frequency of the system band, and multiplexes the paging channel signal, the L1/L2 control channel signal, and the data channel signal in another plurality of frequency blocks that include a frequency block including the center frequency of the system band, the number of the another plurality of the frequency blocks being greater than the number of the plurality of the frequency blocks in which the synchronization channel signal and the broadcast channel are multiplexed.

2. The transmission apparatus claimed in claim 1, wherein the multiplexing portion multiplexes the synchronization channel signal in the even number of frequency blocks.

3. The transmission apparatus claimed in claim 1, wherein the synchronization channel signal generated in the synchronization channel signal generation portion is used for cell search by a mobile station, and wherein the multiplexing portion multiplexes the data channel signal taking into consideration a cell search timing at the mobile station.

4. The transmission apparatus claimed in claim 2, wherein the synchronization channel signal generated in the synchronization channel signal generation portion is used for cell search by a mobile station, and wherein the multiplexing portion multiplexes the data channel signal taking into consideration a cell search timing at the mobile station.

5. A transmission method comprising steps of:
generating a synchronization channel signal;
generating a broadcast channel signal;
generating a paging channel signal;
generating an L1/L2 control channel signal;
generating a data channel signal;
multiplexing the synchronization channel signal, the broadcast channel signal, the paging channel signal, the L1/L2 control channel signal, and the data channel signal; and
transmitting the multiplexed signal,
wherein a variable-width system band is divided into a plurality of frequency blocks, each of which is comprised of a plurality of continuous sub-carriers, in the multiplexing step, and
wherein in the multiplexing step, the synchronization channel signal and the broadcast channel signal are multiplexed in a plurality of frequency blocks whose number is determined so that a width of the plurality of the frequency blocks is smaller than the smallest width among widths of corresponding variable bands, regardless of the width of the system band, the plurality of the frequency blocks including a center frequency of the system band, and the paging channel signal, the L1/L2 control channel signal, and the data channel signal are multiplexed in another plurality of frequency blocks that include a frequency block including the center frequency of the system band, the number of the another plurality of the frequency blocks being greater than the number of the plurality of the frequency blocks in which the synchronization channel signal and the broadcast channel are multiplexed.

6. The transmission method claimed in claim 5, wherein the synchronization channel signal is multiplexed in the even number of frequency blocks, in the multiplexing step.

7. The transmission method claimed in claim 5, wherein the synchronization channel signal is used for cell search by a mobile station, and wherein the data channel signal is generated taking into consideration a cell search timing at the mobile station, in the multiplexing step.

8. The transmission method claimed in claim 6, wherein the synchronization channel signal is used for cell search by a mobile station, and wherein the data channel signal is generated taking into consideration a cell search timing at the mobile station, in the multiplexing step.

* * * * *